May 19, 1970     R. G. POWELL ET AL     3,512,739
HYDRAULICALLY CUSHIONED RAILWAY TRAILER HITCH

Filed Nov. 16, 1967     5 Sheets-Sheet 1

INVENTORS
RICHARD G. POWELL
EULAS R. ATKINSON
BY
*James D. Jackson*
AGENT

INVENTORS
RICHARD G. POWELL
EULAS R ATKINSON
BY
*James Jackson*
AGENT

May 19, 1970 R. G. POWELL ET AL 3,512,739
HYDRAULICALLY CUSHIONED RAILWAY TRAILER HITCH
Filed Nov. 16, 1967 5 Sheets-Sheet 4
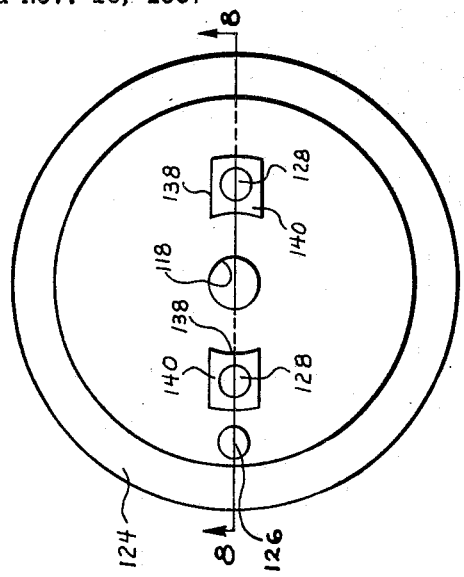
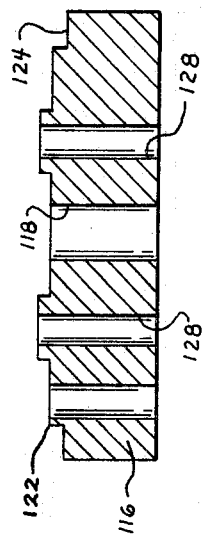
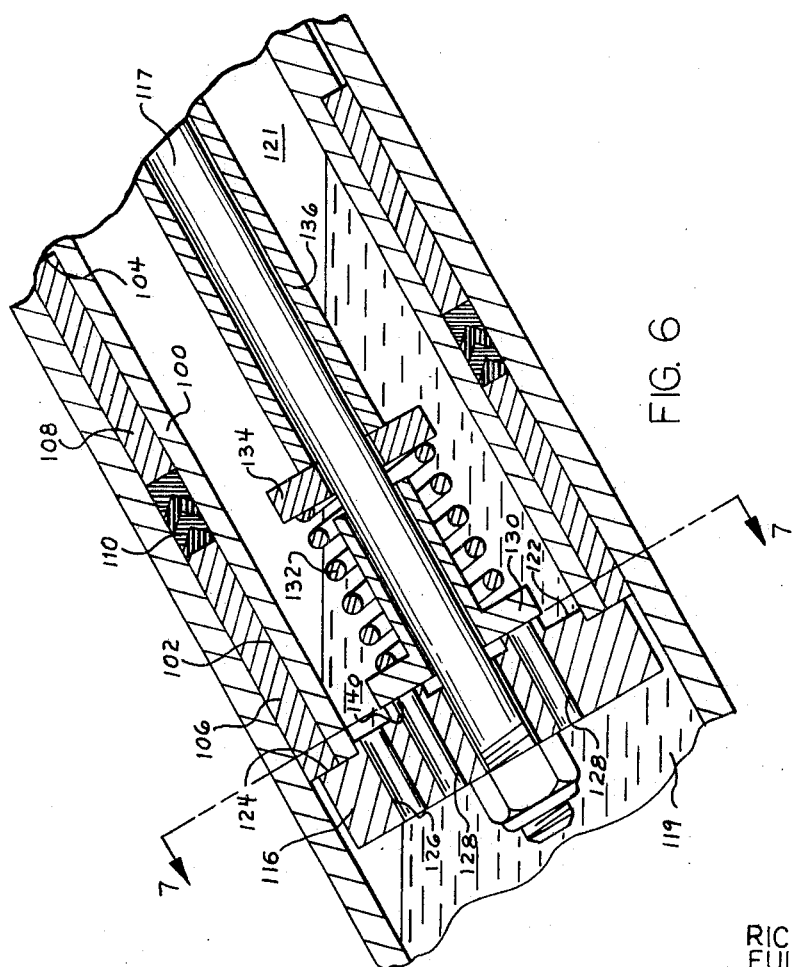
INVENTORS
RICHARD G. POWELL
EULAS R. ATKINSON
BY
James Jackson
AGENT

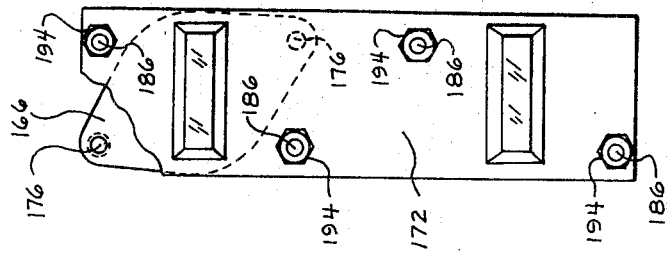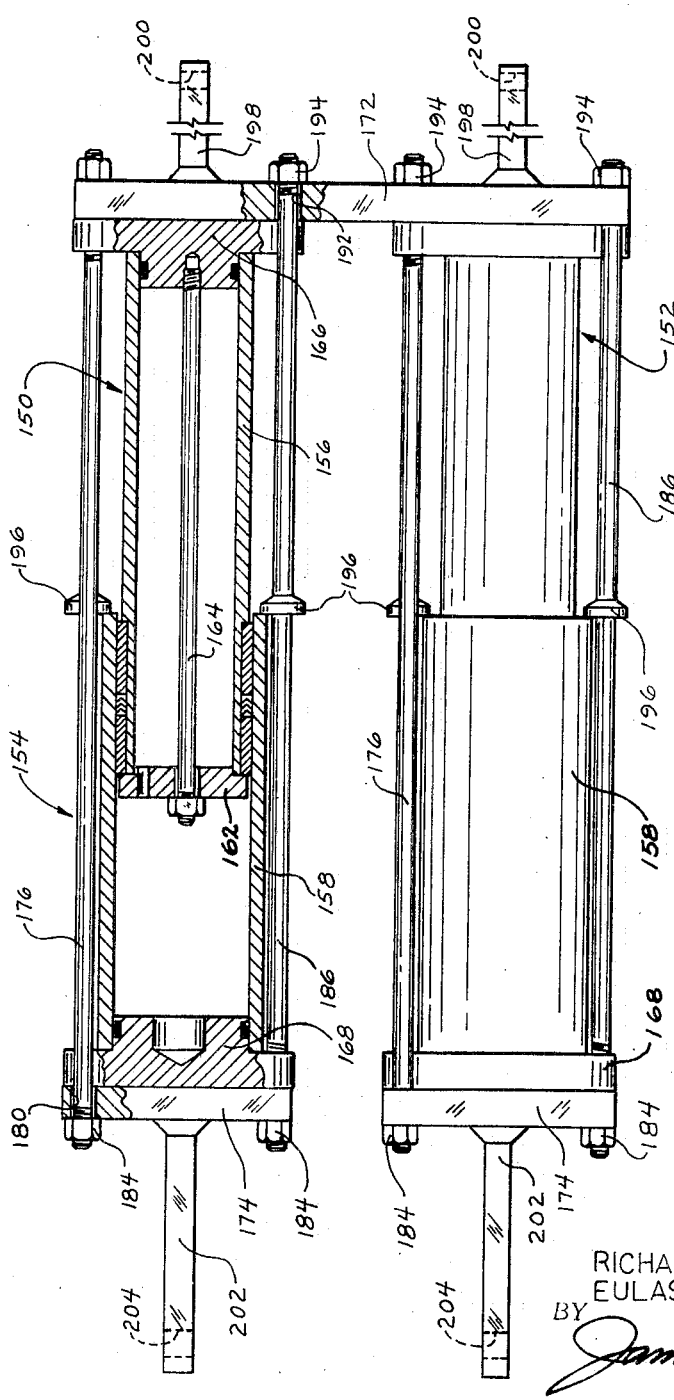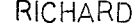

United States Patent Office 3,512,739
Patented May 19, 1970

3,512,739
HYDRAULICALLY CUSHIONED RAILWAY
TRAILER HITCH
Richard G. Powell, Houston, and Eulas R. Atkinson,
Conroe, Tex., assignors to ACF Industries, Incorporated, New York, N.Y., a corporation of New Jersey
Filed Nov. 16, 1967, Ser. No. 683,500
Int. Cl. B60p 7/16; F16f 5/00
U.S. Cl. 248—119                          15 Claims

ABSTRACT OF THE DISCLOSURE

A cushioned collapsible trailer hitch for securing a trailer to a railway car including an energy dissipating shock absorbing diagonal support to protect the trailer from excessive shock. The diagonal support is provided with a pair of parallel hydraulic shock absorbers, each having structure for controlling fluid transfer in response to internal pressure differential.

BACKGROUND AND DESCRIPTION OF THE DISCLOSURE

This invention relates generally to trailer hitches or fifth-wheel stands for railroad cars and more particularly to energy dissipating, shock absorbing structure for trailer hitches to protect motor truck trailers from excessive shocks.

The trend of transporting motor truck trailers on railway flat cars, which is commonly referred to as the piggyback system, has been developed primarily to promote more efficient and economical freight handling. The piggyback system involves the transportation of motor truck, semi-trailers between distant points by means of railway cars and transportation of the trailers by motor truck to local destinations without involving unloading and reloading thereof.

For the purpose of transporting trailers, railway flat cars are provided with trailer hitches or fifth-wheel stands, which include structure for releasably connecting the trailer to the flat car to retain the same during transportation. Although trailer hitches may be provided in the form of rigid structures, they frequently are collapsible to allow trailer tractors or other prime movers to position the trailer onto the railway car. Obviously where collapsible trailer hitches are employed, design limitations require a sufficient minimum of clearance between collapsed trailer hitch structure and the prime mover to allow the trailer to be positioned without interference with the trailer hitch.

Collapsible trailer hitches may be substantially rigid or semi-rigid in their upright condition, or they may be provided with various acceptable types of cushioning structure to protect the trailer and its lading from excessive shock. Collapsible trailer hitches which are rigid in their upright position are generally required to be fixed to railway cars having cushioned underframes so that trailers which are connected to the rigid hitches may be protected from the effects of shocks such as those caused by train action during transportation and coupling of the cars during classification in switching yards and the like.

As is evidenced by the prior art, for example U.S. Pat. No. 3,246,866, hydraulically cushioned trailer hitches have been contemplated in the past, but we are not aware of any commercial manufacture of such structures. It has heretofore been considered economically unfeasible to manufacture and market a hydraulically cushioned trailer hitch. To manufacture a trailer hitch having a hydraulic cushioning unit recessed within the bed of the railway car would generally require sufficient car modification to render such a structure economically impractical, thereby adversely affecting the competitive nature of the product.

Hydraulic cushioning units, which are disposed within the diagonal leg of the trailer hitch, are frequently limited by length and diameter requirements which are dictated by trailer hitch design. The trailer hitch generally is required to meet specific design requirements especially in its collapsed position to prevent possible interference with trailers and prime movers during the loading and unloading operations. In limiting the length and diameter design of the diagonal leg cushioning units, such structures may be limited as to cushioning ability.

The need for greater cushioning ability of trailer hitch structures having cushioning devices in the diagonal leg thereof and the requirement for satisfaction of the need within allowable design limits has prompted the development of the instant invention, which includes as a prime object the incorporation of a plurality of parallel related cushioning devices within a diagonal leg structure. The provision of a plurality of hydraulic cushioning units of maximum length and diameter promotes a greater volume of fluid transferred within the cushioning unit and effectively achieves a greater range of cushioning ability.

A further object of the instant invention contemplates the provision of a trailer hitch structure incorporating a plurality of hydraulic cushioning units for the achievement of optimum cushioning ability within a minimum of space.

An important object of this invention contemplates the provision of a novel trailer hitch construction having hydraulic cushion units which are so constructed that damage to the metal bearing surfaces thereof will be prevented.

It is a further object of this invention to provide a novel energy dissipating shock absorbing structure combined with a railway trailer hitch construction and which includes optimum means for controlling fluid pressure transfer within the cushioning unit in response to differential pressures therein caused by impact loads.

Among the objects of this invention is noted the provision of hydraulic cushioning unit structure which effectively maintains proper separation of compressible and incompressible fluid within the cushioning units without physically separating the fluids.

It is among the objects of this invention to provide a novel hydraulically cushioned collapsible trailer hitch construction which is inexpensive in manufacture and reliable in use.

The foregoing along with additional objects and advantages will be apparent from the following description of a specific embodiment of the invention, the description being taken in conjunction with the accompanying drawings in which:

FIG. 6 is a partial side elevation of a cushioning unit in section illustrating the parts thereof and the hydraulic fluid level therein the neutral position of the unit.

FIG. 7 is a view of the orifice plate taken along line 7—7 in FIG. 6.

FIG. 8 is a view of the orifice plate taken along line 8—8 in FIG. 7.

FIG. 9 is a partial sectional view of the diagonal leg of a modified embodiment of our invention.

FIG. 10 is an end view of the diagonal leg of FIG. 9 having a portion thereof broken away to show the end cap structure of one of the cushioning units.

Figure 1:
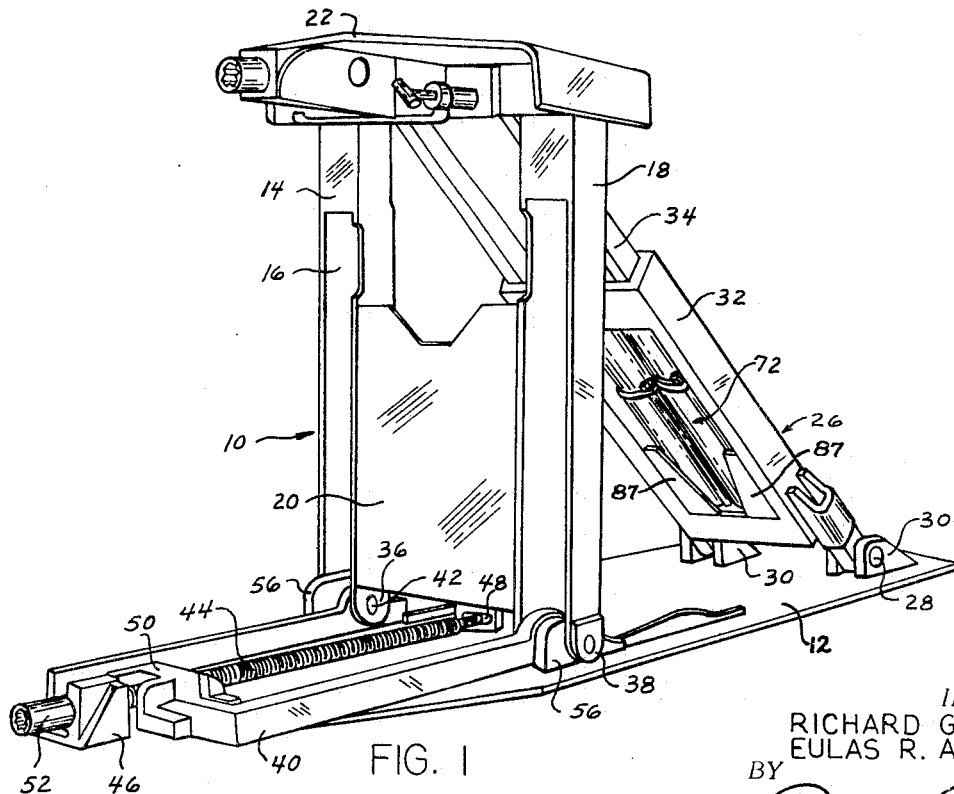
FIG. 1 is a perspective view of a collapsible trailer hitch constructed in accordance with the spirit and scope of this invention.

With reference now to the drawings for a more detailed description of our invention, FIG. 1 illustrates a preferred embodiment of our invention which comprises a trailer hitch or support device 10 for the fifth-wheel of a semi-trailer to be transported by a railway flat car. The trailer hitch structure 10 is preferably mounted on a base plate 12 which is welded or otherwise fixed to the deck of a railway flat car, not shown. The trailer hitch structural elements, however, may be directly connected to the deck of the railway flat car, if desired, without departing from the spirit or scope or this invention. The trailer hitch structure includes a vertical support 14 including a pair of parallel legs 16 and 18 which are interconnected by means of a brace plate 20 or similar bracing structure. A fifth-wheel support structure 22 is connected by means of a pivot to the upper extremity of the legs 16 and 18 and is adapted to pivot from a position substantially normal to the vertical support 14 in the upright position of the hitch as shown in FIG. 1 to a position substantially parallel to the vertical support 14 in the collapsed position of the hitch 10. This pivotal movement allows the fifth-wheel support to be disposed in substantially parallel relation with the base plate 12 in both the upright and collapsed positions of the hitch.

The fifth-wheel support 22 may be constructed in accordance with any one of a number of commercially acceptable types which releasably secure the fifth-wheel of a semi-trailer to the trailer hitch structure.

The trailer hitch is provided with a diagonal brace or diagonal leg shown generally at 26 which is pivotally connected to the upper extremity of the vertical support 14 and has its lower extremity connected by means of a pivot 28 to a lug 30 which is welded or otherwise fixed to the base plate 12. The diagonal leg 26 is constructed in the form of a telescoping frame including an outer frame 32 which receives an inner frame 34 in telescoping relation therein. The specific construction of the diagonal leg 26 and its operative relationship with the structural elements of the trailer hitch 10 will be set forth in detail hereinbelow.

Each of the vertical parallel legs 16 and 18 of the vertical support 14 is bifurcated at its lower extremity defining inner and outer clevis plates 36 and 38 respectively. A horizontal operating frame 40 is connected by means of pivots 42 to the inner clevis plates 36 thereby establishing pivotal connection between the horizontal frame and the vertical support 14. An operating screw 44 for raising and lowering the trailer hitch 10 between its operative and stored or collapsed positions is retained in parallel relation with the base plate 12 by bearing structures 46 and 48. The operating screw 44 is provided with drive threads and is threadingly received within an internally threaded frame drive assembly 50 carried by the operating frame 40. The operating screw 44 is provided at its outer extremity with drive connection structure 52 for connecting the operating screw to manual or mechanical means for imparting rotation to the operating screw.

In the operative position of the trailer hitch 10 as illustrated in FIG. 1, the pivot pins 42 are maintained in engagement with abutment lugs 56, which are fixed to the base plate 12 by welding or the like. In the operative position of the trailer hitch as shown in FIG. 1, the pivot pins 42 will form a substantially fixed pivot for the lower extremities of the vertical supports. To collapse the trailer hitch to its stored or collapsed position, the operating screw 44 is rotated in a direction driving the operating frame 40 rearwardly toward the lugs 30. The operating frame by virtue of its connection with the vertical support will force the lower portion of the vertical support 14 rearwardly thereby causing the vertical support to be lowered to a position where it lies flat on the base plate 12 or on the deck of the railway car. At the same time, the fifth-wheel support will pivot to a position where it is substantially parallel with the vertical support 14 and will be lowered with the vertical support until it rests flat on or adjacent to the deck of the railway car. The collapsed height of the trailer hitch is such that riser boards are not required to maintain proper clearance between the collapsed hitch and the axle of a trailer being loaded onto the car. This feature promotes the competitive nature of railway cars by achieving low cost construction.

Figure 3:
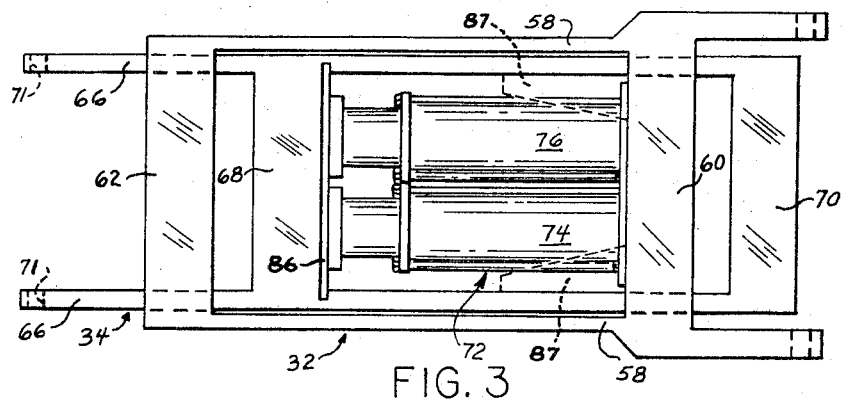
FIG. 3 is a plan view of the diagonal leg structure illustrating the diagonal leg structure and the shock absorbers in the compressed condition thereof.
Figure 2:
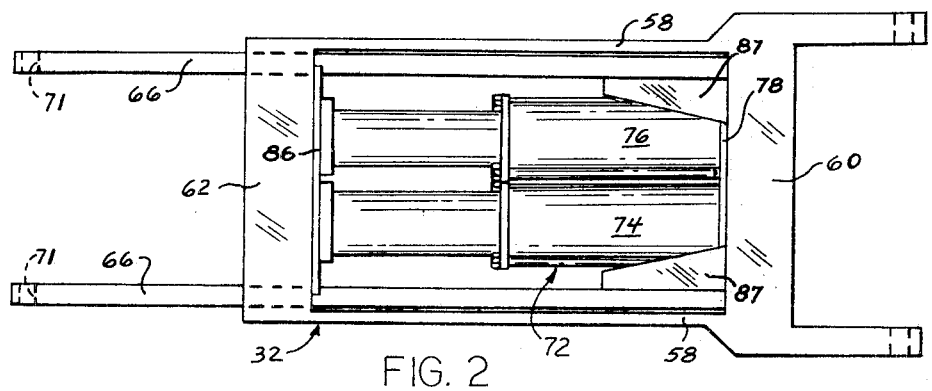
FIG. 2 is a plan view of the diagonal frame assembly of the hitch of FIG. 1 showing the diagonal leg in its neutral position and illustrating the relationship of the shock absorbers to the diagonal leg structure.

With reference now to FIGS. 2 and 3, the diagonal leg 26 comprises a pair of parallel outer rails 58 having transverse brace plates 60 and 62 fixed therebetween to maintain the rails 58 in substantially parallel relationship and defining a generally rectangular parallelogram. The inner frame 34 comprises a pair of substantially parallel rails 66 having pairs of transverse brace plates 68 and 70 fixed therebetween is received in telescoping relationship within the outer frame 32. The lower extremity of the outer frame 32 is connected to the pivot lug 30 by the pivot pin 28. The upper pivot pin connecting the fifth-wheel support to the vertical support is also received within pivot apertures 71 formed at the extremity of the inner frame 34 thereby pivotly connecting the upper portion of the diagonal leg to the fifth-wheel support assembly 22 and the vertical support 14. The parallelogram structure defined by the outer frame 32 and the inner frame 34 interfit to define a generally rectangular opening in which is disposed a cushioning unit assembly 72.

The cushioning unit assembly 72 comprises a pair of gas-hydraulic cushioning units shown generally at 74 and 76 which are disposed in generally parallel relationship. The cushioning unit assembly 72 is provided at its lower extremity with a guide plate 78 which is received within the inner rails 66 and which retains the lower portion of the cushioning unit assembly within the diagonal leg structure. The normally disposed transversed plates 70 also form an abutment for the guide plate 78. A second guide plate 86 is retained at the opposite extremity of the cushion unit assembly 72 and is normally disposed in abutment with the transverse support plates 62 of the outer frame 32. The guide plate 86 serves to retain the upper extremity of the cushioning unit assembly within the diagonal leg structure while proper positioning of the lower extremities of the cushioning units is maintained by generally triangular fillet plates 87 which are welded or otherwise fixed to the outer frame 34. The fillet plates 87 are shown in full line in FIGS. 1 and 2 but the purposes of clarity are shown in dash line in other figures of the drawings. Thus, it is apparent that the cushion unit assembly is movably confined within the telescoping inner and outer frames 32 and 34 and is maintained in proper position relative to the frames by the guide plates 78 and 86.

Figure 4:
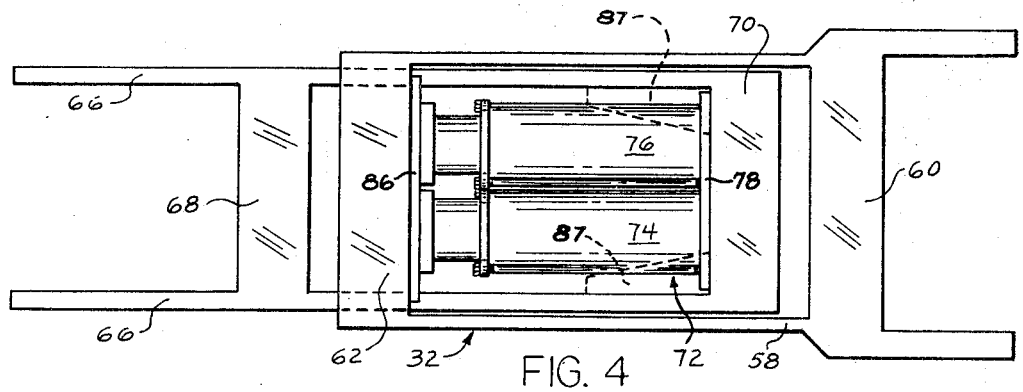
FIG. 4 is a plan view of the diagonal leg structure illustrating the cushionnig units and the structural elements of the diagonal leg in the extended position thereof.

With reference now to FIGS. 2, 3 and 4, it will become apparent that the cushioning unit assembly 72 is compressed to dissipate energy regardless of the direction of impact which is transmitted to the diagonal leg of the hitch. In the centered or neutral position of the diagonal leg as shown in FIG. 2, the guide plate 78 is disposed in engagement with the transverse plates 60 and the transverse plates 70 on the outer frame and inner frame, respectively. In the centered position of the diagonal leg, the upper guide plate 86 is maintained in abutment with the transverse plates 68 of the inner frame 34 and the transverse plates 62 of the outer frame 32. In the event impact forces on the trailer and fifth-wheel structure force the vertical support 14 to be rotated rearwardly about the pivot 42, the inner frame 34 will be telescoped inwardly relative to the outer frame 32 as illustrated in FIG. 3. When this occurs the transverse support plates 68, being rigid with the inner frame 34, will force the upper portion of the cushioning unit assembly 72 in a rearward direction. Under this condition, the lower transverse support plates 70 will move out of contact with the lower guide plate 78 and the guide plate 78 will be maintained in abutment with the transverse plate 60 of the outer frame 32 thereby causing the cushioning unit assembly 72 to become compressed and resulting in energy dissipation.

In the event impact forces on the trailer cause the vertical support to rotate forwardly about its pivot, the inner frame will become telescoped outwardly with regard to the outer frame as illustrated in FIG. 4. When this occurs, the transverse plate 68 will move out of abutment with the upper guide plate 86 and the transverse plate 62 of the outer frame 32 will prevent upward movement of the uppermost portion of the cushioning unit assembly. The lower transverse plates 70 of the inner frame however will move the lower guide plate 78 out of abutment with the transverse plates 60 thereby causing compression of the cushioning unit assembly which results in dissipation of energy. It is therefore clearly apparent that impact loads from either direction causing either forward or rearward pivoting of the vertical support 14 will result in compression of the cushioning unit assembly and dissipation of energy.

Figure 5:
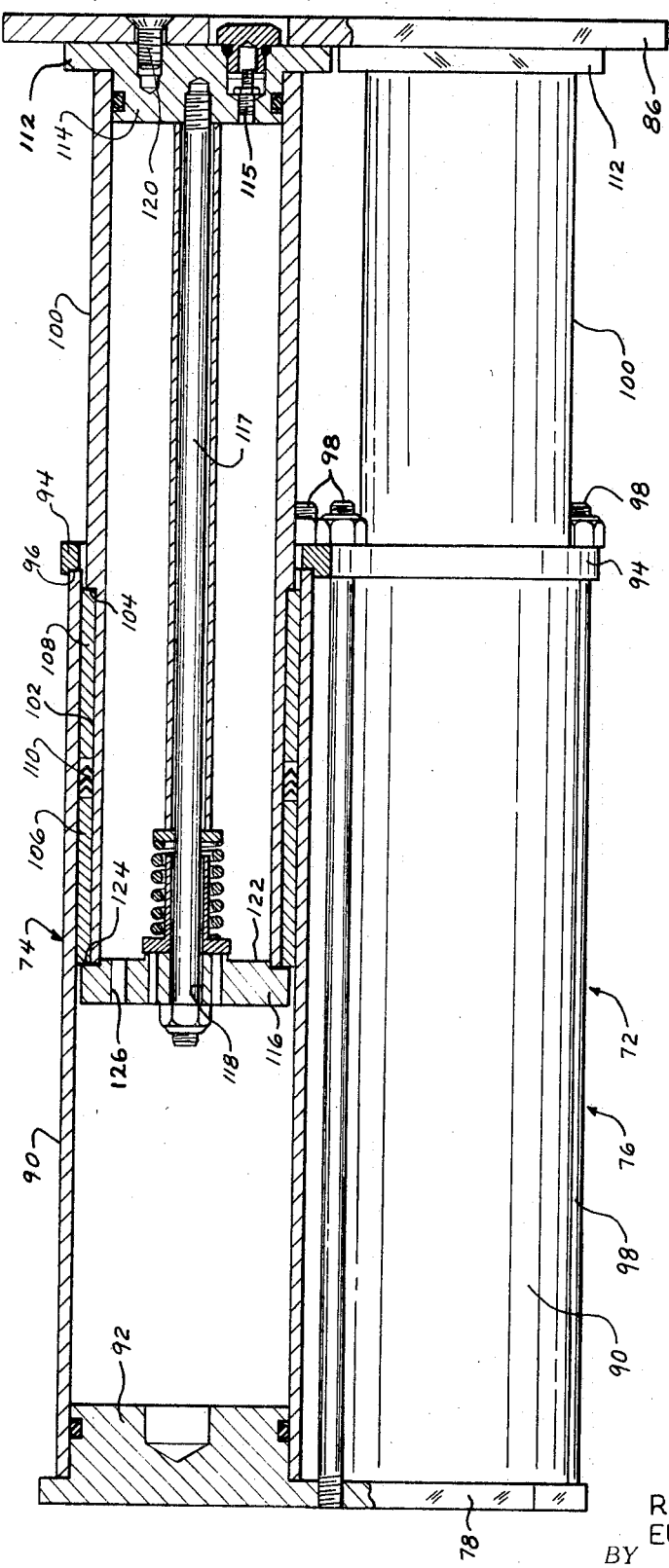
FIG. 5 is a partial sectional view of the cushioning units of FIG. 1 illustrating the cushioning units in detail in the neutral position thereof.

With reference now to FIG. 5 for a detailed description of the cushioning unit assembly 72, the hydraulic cushioning units 74 and 76 are disposed in substantially parallel relationship with the outer cylinders 90 thereof disposed at the lower portion of the diagonal leg. The lower guide plate 78 is provided with a pair of generally cylindrical projections 92 which are received in sealed relation within the outer cylinders 90. The cushioning units 74 and 76 are generally identical and for the sake of simplicity the unit 74 is shown in full line while the cushioning unit 76 is illustrated in section. Internal structure such as that shown in the cushioning unit 74 will also be found in the cushioning unit 76. The cylindrical projections 92 are fixed to the guide plate 78 or are formed integrally with the guide plate and serve to maintain proper spacing of the outer cylinders 90 in addition to providing closures for the lower ends of the outer cylinders. An outer cylinder retainer 94 is provided for each of the cushioning units and is formed with an annular internal recess 96 which receives the upper end of the respective outer cylinder 90. The retainers 94 are noncircular members defining a pair of opposed ears having bolt apertures therein. Reference may be had to FIG. 10 where element 166 illustrates the general shape of the the retainers. The retainers 94 are maintained in engagement with the outer cylinders 90 by a pair of outer cylinder studs or tie bolts 98 which are threadedly received within the guide plates 78 and extend through the bolt apertures. The studs 98 serve to positively retain the guide plate 78 in a position closing the lower end of the outer cylinders 90.

Each of the hydraulic cushioning units is provided with an inner cylinder 100 which is telescopingly received within the outer cylinder 90. The inner portion of the inner cylinder 100 is provided with a reduced diameter portion 102 which defines an annular shoulder 104. A bearing and packing assembly, including a pair of spaced generally cylindrical bearings 106 and 108 and a packing assembly 110 interposed between the bearings, is received about the reduced diameter portion 102 of the inner cylinder. Each of the inner cylinders 100 is provided with an end cap 112 having a generally cylindrical portion 114 thereof received in sealed relationship with the upper extremity inner cylinder 100. A gas valve assembly 115 is received within the end cap 114 so that pressurized gas may be introduced into the cushioning unit to provide a preload pressure. Each of the cylinders 100 is also provided with an orifice plate 116 which forms a closure for the inner extremity thereof and which divides the cushioning unit into a lower fluid chamber 119 and an upper fluid chamber 121. The orifice plate 116 and the end cap 112 are maintained in assembly with the inner cylinder 100 by an inner cylinder stud 117 which is threadedly received within the end cap 112 and extends through a centrally located aperture 118 in the orifice plate 116. The upper guide plate 86 is retained in assembly with the end cap members 112 by a pair of bolts 120, which extend through apertures formed in the guide plate 86 and are threadedly received within the end cap 112.

An important feature of our invention concerns the general relationship of the inner and outer cylinders and the bearing assembly. The bearing and sealing surface of the outer cylinder is formed on the internal diameter thereof and the bearing assembly is carried by the inner cylinder, as described above, for bearing and sealing engagement therewith. This relationship assures that the bearing and sealing surface of the cushioning unit is never exposed so that the same may be damaged by corrosion or by contact with foreign objects. This feature is very important especially considering the generally hostile environments to which railway cars are frequently subjected. This feature also promotes low cost construction since only a single surface, i.e., the internal surface of the outer cylinder, is finished to sufficient tolerance to provide a bearing and sealing surface. The other metal surfaces of the unit may be machined to comparatively low tolerances. This feature promotes low cost of the cushioning unit thereby adding to the competitive nature of the product.

The construction of the bearing assembly also promotes the low cost aspects of the cushioning units since the spaced bearings 106 and 108 are identical and since they serve to contain the packing 110. The bearings provide bearing surfaces of considerable length which maintain precise alignment between the inner and outer cylinders and which promote long operative life of the bearing surface of the outer cylinder and of the bearings themselves.

Referring now to FIG. 6, which illustrates the cushioning unit in its operative position, the orifice plate 116 is provided with an annular recess defining a generally cylindrical extension 122 which is received within the inner cylinder 100, thereby serving to properly align the orifice plate with the inner cylinder. The outer periphery of the orifice plate 116 extends radially beyond the reduced diameter portion 102 of the inner cylinder and defines an annular abutment or shoulder 124 which is disposed for engagement with the innermost bearing member 106. The shoulder 124 serves to retain the bearing assembly and the packing assembly in proper position about the reduced diameter surface 102.

The orifice plate 116 is provided with at least one fixed orifice 126 which maintains fluid communication between the chambers 110 and 121 at all times. For the purpose of simplicity the orifice plate is illustrated 90° out of position so that the orifices may be visualized in the FIG. 5 view of the cushioning unit assembly. FIG. 6 shows the orifice plate 116 in its proper position. For simple construction of the cushioning units of our invention, the flow of fluid between the upper and lower fluid chambers will be controlled solely by the fixed orifice such as is indicated in FIG. 9 with respect to the orifice plate 162. In event the anticipated impact forces will be high or in the event more efficient cushioning is desired the orifice plate 116 will be provided with at least one, and preferably a plurality of normally closed modulator orifices 128 which are normally closed by a modulator valve 130. A modulator valve 130. A modulator valve spring 132 is interposed between the modulator valve 130 and an annular washer 134 and serves to bias the modulator valve 130 to its closed position. A spacer tube 136 is disposed about the inner cylinder stud 117 and abuts the end cap 112 and the washer 134 to maintain the washer 134 in its proper position and to maintain the spring 132 under the proper degree of compression. The length of the spacer tube 136 may be varied for the purpose of controlling compression of the spring 132 to control the opening and closing pressure of the modulator valve 130.

As illustrated in detail in FIGS. 7 and 8, the orifice plate 116 is provided with axial projections 138 which define raised surfaces 140 about each of the modulator orifices 128. The raised surfaces 140 are coplanar and are engaged by the planar sealing face 140 of the modulator valve 130 to establish a metal-to-metal seal therebetween.

The simple unmodulated modification of the cushioning units of our invention will be quite simple in construction and low in cost by virtue of the elimination of the modulator valve, spring, washer and spacer tube in addition to the modulator orifice construction on the orifice plate. This simple modification is far superior in cushioning ability as compared with convention resilient hitch cushioning elements although not as efficient as the modulated construction described above.

The hydraulic cushioning units of our invention may be provided with mechanical means such as a compression spring for recentering the diagonal leg of the trailer hitch structure subsequent to compression or extension of the same instead of utilizing pressurized gas to develop the recentering force without departing from the spirit or scope of this invention. The modulator valve, according to this concept of our invention, will be operative responsive solely to the dynamic pressure of the fluid within the lower chamber of the cushioning unit. The fluid pressure will act on the exposed areas of the modulator valve to produce a force thereon sufficient to overcome the bias of the modulator valve spring.

An important structural feature of our invention involves the use of a single cylinder stud to retain the orifice plate, the modulator valve, valve spring and spacer tube in assembly with the inner cylinder. The single stud also retains the bearing and packing assembly in its proper position on the inner cylinder in addition to maintaining the end cap 112 in its position closing the outer end of the inner cylinder. The single stud also indirectly supports the guide plate 86 which in turn supports the unit within the diagonal leg structure. Accomplishment of all of these features through the use of a single stud is quite material in maintaining production costs of the units at a low level.

Upon compression of the cushioning units 74 and 76 resulting from an impact force on the hitch as indicated above, fluid pressure within the lower chamber will increase thereby forcing the hydraulic fluid through the metering orifice 126 into the upper fluid chamber and achieving compression of the compressible fluid in the upper chamber 121. As fluid pressure within the lower chamber increases sufficiently that, acting through the areas defined by the orifices 128, the pressure will overcome the combined forces of the preload pressure acting through the areas defined by the surfaces 140, and the force of the spring 132 acting on the modulator valve, the modulator valve 130 will be caused to open thereby allowing the flow of fluid through the modulator orifices 128 to be added to the flow of fluid established through the metering orifice 126. As the fluid pressure within the lower chamber is reduced at the end of the compression stroke, upon reaching a predetermined minimum pressure differential the modulator valve 130 will be urged by the spring 132 and the fluid pressure within the upper chamber 121 to its closed position thereby closing the modulator orifices 128 and requiring that further fluid transfer between the chambers 119 and 121 be controlled by the metering orifice 126.

It should be observed that upon compression of the hydraulic units 74 and 76 a large volume of hydraulic fluid will be forced from the lower chamber 119 through the metering orifice 126 and the modulating orifices 128 into the upper fluid chamber 121. At the same time, the gas pressure within the upper chamber will be substantially raised by virtue of compression of the compressible fluid therein. Upon centering of the diagonal leg, i.e., by movement of the diagonal leg structure from the compressed or extended position thereof as illustrated in FIGS. 3 and 4, respectively, to the centered position thereof as illustrated in FIG. 2, the cushioning units 74 and 76 will move to the fully extended position thereof as illustrated in FIG. 5. Upon extension of the cushioning units, the fluid previously forced from the lower chamber 119 to the upper chamber 121 will be forced to return to the chamber 119 through the metering orifice 126. Even though the pressure forcing the fluid into the lower chamber will be quite high at the end of a compression stroke, rapid movement of the cushioning unit to its fully extended or neutral position is prevented by the metering orifice 126 which provides restriction to the fluid flow during recentering of the diagonal leg. The modulator valve 130 will remain closed during extension of the cushioning unit thereby requiring that all fluid transfer upon extension occur only through the metering orifice 126 thereby providing a restricted transfer of fluid in the return direction which provides a snubbing action during the recentering movement to prevent slamming.

It is an important aspect of our invention that the cushioning units 74 and 76 are inoperative except when the same are incorporated within the diagonal leg structure of the trailer hitch 10. To prevent the cushioning units from being extended to the point that the inner and outer cylinders thereof become separated, the cushioning units must be installed within the diagonal leg to limit the extension thereof to that obtained at the centered position of the diagonal leg as shown in FIG. 2. The cushioning units therefore constitute an integral part of the diagonal leg in the operation condition thereof.

Another important feature of our invention concerns the inclined position of the hydraulic cushioning units 74 and 76 in all of the operative positions of the trailer hitch structure 10. As illustrated particularly in FIG. 6, the cushioning units are charged with an incompressible fluid such as hydraulic fluid to the level indicated in FIG. 6. The cushioning units are then charged with a compressible fluid such as nitrogen gas, for example, which is introduced through the valve assembly 115 to maintain the fluid within the units at a predetermined pressure, for example 600 p.s.i., referred to as the preload pressure. The metering orifice 126 in the orifice plate 116 in the operative position of the cushioning unit as shown in FIG. 6 is located at the uppermost portion of the orifice plate at a position immediately adjacent the inner wall of the inner cylinder 100. This feature effectively restricts the amount of compressible fluid which may become entrapped within the lower chamber. Upon rapid compression and extension of the cushioning unit, it is contemplated that some of the compressible fluid may become entrained in the hydraulic fluid as foam and may be drawn into the lower fluid chamber 119 upon extension of the cushioning unit. In the static position of the cushioning unit, the compressible fluid or gas will separate from the hydraulic fluid and will flow back into the upper chamber through the metering orifice 126. Location of the metering orifice at the uppermost portion of the orifice plate therefore allows the lower chamber 119 to be maintained substantially free of compressible fluid. This feature effectively eliminates the requirement for compression of a large volume of gas prior to the metering of liquid through the metering orifice 126. Substantial dissipation of energy therefore will occur immediately upon the application of forces to the cushioning unit since the lower fluid chamber is maintained substantially free of compressible fluids.

With regard to FIGS. 9 and 10, a modified embodiment of the invention is illustrated including a pair of substantially parallel cushioning units 150 and 152 which cooperate with other hitch structure to define the diagonal leg 154 of a trailer hitch construction similar to that illustrated in FIG. 1. Each of the cushioning units 150 and 152 may be provided with internal metering and fluid modulating structure which is similar to that described above in regard to FIG. 5 and therefore the internal structure of the cushioning units will not be discussed in detail. If desired, the modulating feature may be eliminated resulting in a structure essentially as shown in FIG. 9. Again the orifice plate is shown 90° out of position for the purpose of simplicity. Each of the cushioning units 150 and 152 comprises inner and outer cylinders 156 and 158 which are disposed in telescoping relationship. A bearing and packing assembly 160, essentially the same as discussed above regarding FIG. 5, is interposed between the inner and outer cylinders to provide bearing engagement therebetween and to maintain a fluidtight seal to prevent loss of fluid from within the cylinder. An orifice plate 162 is maintained in engagement with the inner extremity of the inner cylinder 156 by a stud 164 also in the same manner as described above in regard to FIG. 5. The orifice plate 162 serves to maintain the bearing and packing assembly 160 in its proper position between the inner and outer cylinders. The outer extremities of the inner and outer cylinders are closed by end caps 166 and 168 respectively which are disposed in sealing engagement with the respective cylinder. The end caps are of noncircular configuration as shown in FIG. 10 and define a pair of opposed ears which are formed with apertures to receive connecting tie bolts.

In the neutral position of the diagonal leg structure 154 an upper yoke plate 172 is disposed in abutment with the end caps 166 of the inner cylinders 156 and a pair of lower yoke plate structures 174 are disposed in abutment with the end caps 168 of the outer cylinders 158. A pair of tie bolts 176 extend past the ears of the end caps 168 and through apertures 180 formed in the yoke caps 174. The other extremity of the tie bolts 176 are threadedly received within threaded apertures formed in the end cap 166. A pair of nuts 184 are received on the bolts 176 and serve as stops to retain the end cap 166 and 168 and the yoke plate 174 in assembly with the outer cylinder. A second pair of tie bolts 186 are disposed with one extremity thereof threadedly received within threaded apertures formed in the end cap 168 and with the other extremity thereof extending past the ears of the end cap 166 and 192 formed in the upper yoke plate 172. A pair of nuts 194 received on the bolts 186 serve as stops to maintain the upper yoke plate 172 in assembly with the end cap structures 166 and 168.

A pair of stop members 196 are fixed to each of the bolts 186 and engage the upper extremity of the outer cylinders 158 to maintain the outer cylinders in fluidtight assembly with the end caps 168. A pair of connecting bars 198 are connected to the upper yoke plate 172 and are disposed in generally parallel relation. The connecting bars are provided with apertures 200 at the upper extremity thereof for pivotal connection of the upper end of the diagonal leg to the upper portion of the vertical support 14 of a trailer hitch structure in the same manner as described above in regard to FIG. 1. A pair of lower connecting bars 202 are fixed to the yoke cap members 174 by welding or the like and are provided with apertures 204 at the lower extremity thereof for connection of the lower extremity of the diagonal leg 154 to pivot lugs which are mounted on a base plate structure, as illustrated at 30 in FIG. 1.

Figure 11:
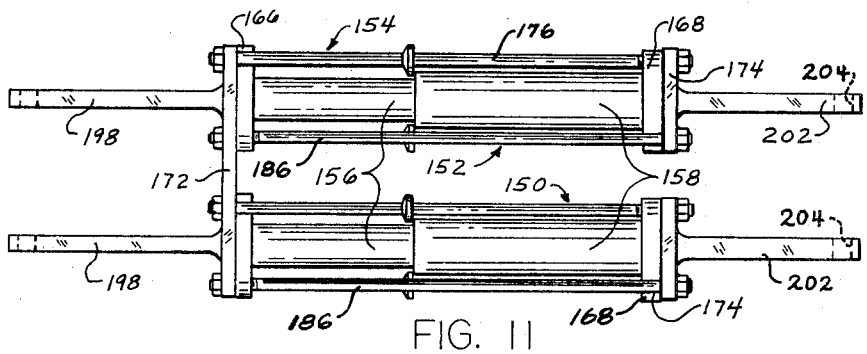
FIG. 11 is a plan view of the diagonal leg structure of FIG. 9 illustrating the same respectively in the extended and compressed positions thereof.
Figure 12:
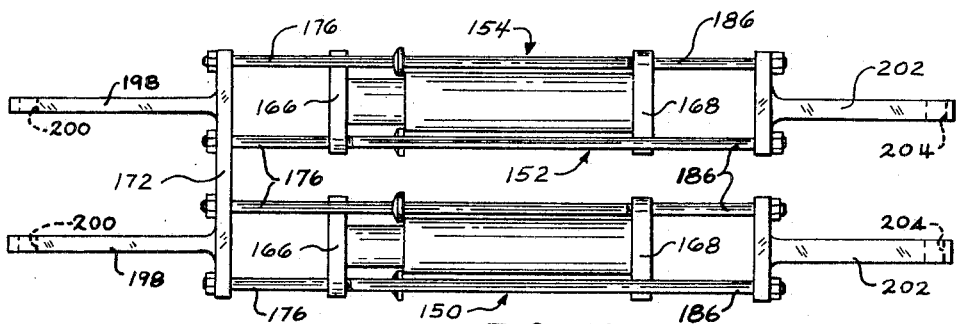
FIGS. 12 and 13 are plan view of the diagonal leg structure of FIG. 9 illustrating the same respectively in the extended and compressed positions thereof.
Figure 13:
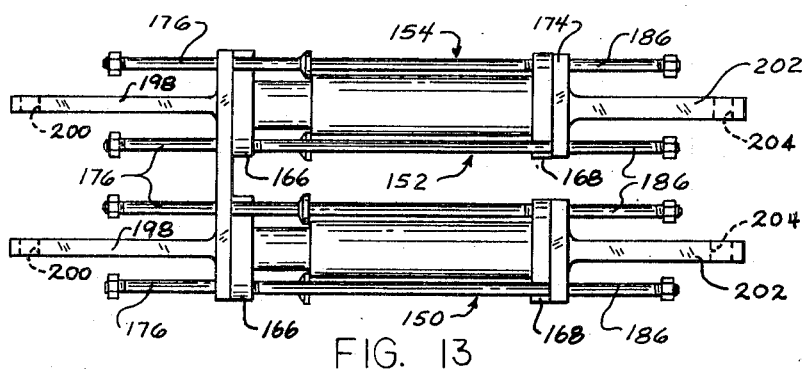

With reference now to FIGS. 11, 12 and 13, it will be evident that the cushioning units 150 and 152 of the diagonal leg 154 are subjected to compression when the diagonal leg of the trailer hitch is subject to impact forces from either direction, in the same manner as discussed above in regard to the diagonal leg structure 26 of FIG. 1. In FIG. 11, the cushioning units 150 and 152 are disposed in their fully extended position and the diagonal leg structure 154 is disposed in its neutral position. The yoke caps 174 are maintained in engagement with the end caps 168 and the yoke plate 172 is maintained in abutment with the end caps 166 of the inner cylinder 156.

In the event the vertical support of a trailer hitch structure should be pivoted forwardly, such as might occur upon forces developed by coupling one railway car to another, the diagonal leg 154 would be moved to its extended position, as illustrated in FIG. 12, from the neutral position of FIG. 11. As the diagonal leg structure is extended the tie bolts 176 which are threadedly connected to the end cap structure 168 will be extended by the yoke plate 172 while the tie bolts 186 will be restrained against movement by the yoke caps 174 by virtue of the connection between the connecting bars 202 and the lugs 30. This will cause the end caps 166 to remain in their neutral position and will result in movement of the end caps 168 toward the end caps 166 thereby resulting in compression of the cushioning units which will cause a transfer of hydraulic fluid within the cushioning units as described above in regard to FIG. 5, thereby resulting in dissipation of energy. Subsequent to the dissipation of energy which results from compression of the cushioning unit from the FIG. 11 position thereof to the FIG. 12 position, the increased gas pressure within the cushioning unit will cause a retransfer of hydraulic fluid from the upper chambers to the lower chamber thereof causing the cushioning units 150 and 152 to expand toward the neutral or FIG. 11 position thereof. Upon such cushioning unit expansion, the tie bolt connection between the end cap structures and the yoke plate structures causes the yoke structures to return to the FIG. 11 position thereof. This movement is generally referred to as "recentering."

In the event the trailer hitch structure is subjected to forces which tend to cause pivoting of the vertical support in a forward direction thereby causing compression of the diagonal leg structure, the yoke plate 172 will be forced in a direction toward the yoke caps 174 and the yoke caps will be supported against movement by the connecting bars 202. This will cause an extension of the bolts 176 and 186 through the respective yoke cap and yoke plate, such as is illustrated in FIG. 13. This movement will cause compression of end caps 166 toward end caps 168, thereby compressing the cushioning unit and resulting in a dissipation of energy in the manner described above. Subsequent to dissipation of energy developed by the impact, the cushioning units 150 and 152 will again be moved by internal fluid pressure to the recentered position and at the same time will move the yoke caps 174 and yoke plate 172 to the neutral or FIG. 11 position thereof.

It will be evident from the foregoing that we have provided a unique trailer hitch structure which incorporates a hydraulically cushioned diagonal leg structure which effectively dissipates energy which is transmitted to the trailer hitch structure during impacting of a railway car. Our invention involves a diagonal leg structure for railway trailer hitches which includes a pair of generally parallel related hydraulic cushioning units which are integral parts of the diagonal leg structure. The hydraulic cushioning units will effectively dissipate energy when the collapsible diagonal leg structure of the trailer hitch is being extended from the neutral position by loads applied in one direction and when the diagonal leg structure is being compressed from the neutral position by forces applied to the trailer hitch structure in the other direction.

It is important to note that the hydraulic cushioning unit structures of our invention are only functional when the same are assembled as a part of the diagonal leg structure. It is clearly apparent from the structure described hereinabove that inflation of the hydraulic unit with a compressible fluid such as nitrogen would merely extend the cushioning unit sufficiently to cause separation of the inner and outer cylinders if the cushioning unit were not assembled within the yoke structure of the diagonal leg. The hydraulic cushioning units therefore cooperate with other structure comprising the diagonal leg to define an interrelated diagonal leg structure.

The cushioning units of our invention incorporate an orifice plate structure which effects a barrier defining a pair of fluid chambers within the unit. The orifice plate has a metering orifice formed therein for the purpose of controlling the flow of hydraulic fluid between the chambers and thereby effects dissipation of energy. The orifice plate may also be provided with at least one modulating orifice and a modulating valve is associated with the orifice plate to maintain the modulating orifices in a closed condition during normal low pressure operating conditions. In the event the cushioning units are subjected to a severe load, the hydraulic pressure within the units will increase to the point that the modulating valve will be forced to its open position, thereby allowing hydraulic fluid to flow through the modulating orifices and thereby change the operating characteristics of the cushioning unit to effect efficient operation during severe impact load conditions.

The simple and novel construction of the cushioning units of our invention is effectively promoted by retention of a number of structural elements in assembly by a single stud bolt thereby eliminating the need for a number of structural elements for assembly of the cushioning units and further promoting the competitive nature of our product.

The positioning of the metering orifice in the orifice plate effectively allows the transfer of hydraulic fluid and prevents an accumulation of compressible fluid within the hydraulic chamber to such an extent that the cushioning effect of the hydraulic units could be adversely affected.

Therefore it is clearly evident that our invention is one well adapted to obtain all of the objects hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the appended claims.

As many possible embodiments may be made of the invention without departing from the spirit or scope thereof, it is to be understood that all matters hereinabove set forth or as shown in the accompanying drawings are to be interpreted as illustrative and not in a limiting sense.

We claim:
1. A collapsible trailer hitch for releasably securing a trailer or the like to the deck of a railway car, said hitch comprising a first leg member being vertically disposed when in operative position, a second leg member being inclined at an angle relative to said first leg member when in operative position and being pivotally connected at the upper extremity thereof to said first leg member, said second leg member being a frame assembly including an inner and outer telescoping frame structure defining relatively movable opposed abutments, at least two energy dissipative shock absorbers carried in substantially parallel relation by said frame assembly and being in engagement at each extremity thereof with said abutments, said shock absorbers having an incompressible and a compressible fluid therein, each of said shock absorbers having means dividing the same into upper and lower fluid chambers, means defining fluid communication between said upper and lower fluid chambers, said shock absorbers being compressed by said inner and outer telescoping frame structure upon the application of either buff or draft forces to said trailer hitch.

2. A collapsible trailer hitch as set forth in claim 1, each of said cushioning shock absorbers having inner and outer telescoping cylinders having closed outer ends, bearing means carried by one of said cylinders and having bearing engagement with the other of said cylinders, said dividing means being an orifice plate closing the inner extremity of said inner cylinder, said means establishing fluid communication being a metering orifice disposed adjacent the inner cylinder and being located at the uppermost portion of said orifice plate in the inclined position thereof whereby said lower fluid chamber will be maintained substantially free of said compressible fluid in the static condition of said shock absorber.

3. A collapsible trailer hitch as set forth in claim 2, said outer cylinder having a bearing and sealing surface formed on the internal periphery thereof, bearing and seal means being carried by said inner cylinder and having bearing and sealing engagement with said bearing and sealing surface, whereby, said bearing and sealing surface will be protected from damage by external elements.

4. A collapsible trailer hitch, as set forth in claim 2, at least one modulating orifice formed in said orifice plate, modulator valve means normally closing said modulating orifice and being responsive to a predetermined pressure differential between said upper and lower fluid chambers to open and establish additional fluid communication between said upper and lower fluid chambers, said modulator valve means closing responsive to a predetermined fluid pressure differential between said upper and lower fluid chambers.

5. A railway cushioning unit comprising an outer cylinder having a closed end, an inner cylinder telescopically received within said outer cylinder, bearing and seal means carried by one of said cylinders and being in bearing engagement with the other of said cylinders, an end cap closing the outer extremity of said inner cylinder, an orifice plate closing the inner extremity of said inner cylinder and dividing said cushioning unit into upper and lower fluid chambers, said lower fluid chamber being filled with an incompressible fluid and said upper fluid chamber having a compressible fluid therein which is maintained under pressure, at least one normally open metering orifice formed in said orifice plate and establishing fluid communication between said upper and lower fluid chambers, an elongated stud rigidly interconnecting said end cap and said orifice plate and retaining the same in assembly with said inner cylinder.

6. A railway cushioning unit as set forth in claim 5, said unit being operative in a position inclined with respect to the horizontal, said orifice being located at a position adjacent the inner wall of said inner cylinder and being at the uppermost portion of said orifice plate in the operative position thereof whereby said lower fluid chamber will remain relatively free of said compressible fluid in the static condition of said unit.

7. A railway cushioning unit as set forth in claim 6, said orifice plate having at least one normally closed modulating orifice adapted to establish additional fluid communication between said upper and lower fluid chambers, a modulating valve closing said modulating orifice in the static position of said unit and being responsive to a predetermined differential pressure between said upper and lower fluid chambers to open, thereby increasing the fluid communication between the chambers, said modulating valve being closed responsive to a predetermined fluid pressure differential between said upper and lower fluid chambers, thereby restricting said fluid communicating to said metering orifice.

8. A railway cushioning unit as set forth in claim 7, said stud also retaining said bearing and packing assembly and said modulating valve in assembly with said inner cylinder.

9. A railway cushioning unit comprising an outer cylinder having a closed end, an inner cylinder telescopically received within said outer cylinder, a bearing and seal assembly carried by said inner cylinder and being disposed in bearing engagement with the inner peripheral surface of said outer cylinder, an end cap closing the outer extremity of said inner cylinder, an orifice plate closing the inner extremity of said inner cylinder and dividing said cushioning unit into upper and lower fluid chambers, said lower fluid chamber being filled with an incompressible fluid and said upper fluid chamber having a compressible fluid therein which is maintained under a predetermined fluid pressure, at least one metering orifice formed in said orifice plate and establishing fluid communication between said upper and lower fluid chambers, an elongated stud interconnecting said end cap and said orifice plate and maintaining the same in tight engagement with said inner cylinder, said orifice plate serving to retain said bearing and seal assembly in assembly with said inner cylinder.

10. A railway cushioning unit as set forth in claim 9, at least one modulator orifice formed in said orifice plate, a modulator valve supported by said elongated stud within said inner cylinder and being operative to control the flow of fluid through said modulator orifice, means biasing said modulator valve to a position normally closing said modulator orifice.

11. A railway cushioning unit as set forth in claim 9, said orifice plate extending radially beyond said inner cylinder and defining an annular shoulder, said annular shoulder engaging said bearing and seal assembly and maintaining the same in assembly with said inner cylinder.

12. A railway cushioning unit comprising inner and outer telescoping cylinders having closed outer ends and being operative in an inclined position relative to the horizontal, bearing means disposed about said inner cylinder and being received in bearing engagement within said outer cylinder, seal means establishing a fluidtight seal between said inner and outer cylinders, an orifice plate closing the inner extremity of said inner cylinder and dividing said unit into upper and lower fluid chambers, an elongated stud rigidly interconnecting said orifice plate and said inner cylinder end cap and maintaining the same in assembly with said inner cylinder, said unit having hydraulic fluid disposed within said lower fluid chamber, said orifice plate having at least one normally open metering orifice establishing fluid communication between said upper and lower fluid chambers, said orifice plate having at least one modulator orifice formed therein, a modulator valve being retained by said elongated stud and normally closing said modulator orifice, said modulator valve being opened responsive to a predetermined fluid pressure in said lower chamber to allow the flow of fluid through said modulating orifice to supplement the flow of fluid through said fixed orifice, said modulator valve being closed, responsive to a predetermined fluid pressure in said lower chamber thereby preventing further flow of fluid through said modulator orifice.

13. A cushioning unit as set forth in claim 12, a reduced diameter portion defined on the exterior surface of said inner cylinder and defining an annular abutment, a bearing and seal assembly loosely received by said reduced diameter portion and being in engagement with said annular abutment, said orifice plate extending radially beyond said reduced diameter portion and defining an annular shoulder, said annular shoulder engaging said bearing and seal assembly and retaining the same in its proper position relative to said inner cylinder.

14. A collapsible trailer hitch for railway cars comprising a vertical support, a diagonal leg including upper yoke means connected at the upper extremity of the vertical support, lower yoke means being spaced from said upper yoke means and being connected to the deck or the like of a railway car, at least one hydraulic cushioning unit interposed between said upper and lower yoke means and being disposed in an inclined position with respect to the horizontal in the operative position of said trailer hitch, said cushioning unit having an end cap at either extremity thereof being normally disposed in engagement the respective one of said yoke means, at least one tie bolt connecting said upper yoke means with the lower end cap of said cushioning unit, said tie bolt being movable relative to said upper yoke and immovable with respect to said lower end cap, at least one tie bolt connecting said lower yoke means with the upper end cap of said cushioning unit and being movable with respect to said lower yoke means and immovable relative to the upper end cap of said cushioning unit, whereby said diagonal leg may be extended or compressed relative to a neutral position and said cushioning unit will be compressed during either extension or compression of said diagonal leg.

15. A collapsible trailer hitch as set forth in claim 14, said diagonal leg having at least two substantially parallel cushioning units, said tie bolts being threadedly received in said end caps and extending through apertures formed in said yoke means, stop means received on each of said bolts to maintain said end caps and yoke means in assembly.

References Cited
UNITED STATES PATENTS

| | | | |
|---|---|---|---|
| 2,107,494 | 2/1938 | Onions et al. | 267—64 |
| 3,346,223 | 10/1967 | Broling | 248—119 |

JAMES B. MARBERT, Primary Examiner

U.S. Cl. X.R.

267—64